United States Patent [19]
Borkovitz

[11] 3,710,233
[45] Jan. 9, 1973

[54] POLYPHASE SATURABLE POWER MODULATOR

[75] Inventor: Henry S. Borkovitz, Skokie, Ill.

[73] Assignee: Sola Basic Industries, Inc., Milwaukee, Wis.

[22] Filed: Dec. 15, 1971

[21] Appl. No.: 208,347

[52] U.S. Cl. .................. 323/45, 323/48, 323/56, 323/57, 336/5, 336/148
[51] Int. Cl. ........................ G05f 1/14, H01f 33/00
[58] Field of Search .......... 323/45, 48, 56, 57; 336/5, 336/148, 155, 165

[56] References Cited
UNITED STATES PATENTS

| | | |
|---|---|---|
| 3,172,031 | 3/1965 | Sola .................. 323/56 |
| 3,332,050 | 7/1967 | Vargo ................. 336/148 |
| 3,361,956 | 1/1968 | Sola .................. 323/45 |

Primary Examiner—Gerald Goldberg
Attorney—D. Verner Smythe et al.

[57] ABSTRACT

A three-phase delta zig-zag connected system having high leakage reactance cores with magnetic air gap shunts and with aiding and bucking secondary windings, the bucking windings being controlled by d.c. saturation. The aiding and bucking windings are divided between different phase cores.

4 Claims, 3 Drawing Figures

POLYPHASE SATURABLE POWER MODULATOR

This invention relates to power modulators and especially to one for use as a line voltage or constant current regulator.

Prior art regulating devices for polyphase, such as three phase, have been relatively expensive and have not been completely satisfactory.

One of the objects of the invention is to provide an improved multiphase power modulator.

In one aspect of the invention, a plurality of core and coil transformers are employed, the individual core and coil arrangements following generally the configuration described in U. S. Pat. No. 3,172,031. The primary and aiding secondary winding of a phase are preferably connected as an autotransformer on one side of the magnetic air gap shunt. The bucking secondary winding is connected in series with the aiding secondary winding located on the other side of the magnetic shunt. There is a second set of aiding and bucking windings for the phase concerned, but they are carried on the core of another phase. Similarly, the phase core just described has another portion of an aiding and bucking winding from another phase thereon.

One of the advantages of the connection is that the neutral is maintained from input to output. The output voltages are regulated line to neutral as well as line to line although the control circuit is not connected to neutral.

Other objects, advantages, and features of the present invention will become apparent from the following description and drawings, which are merely exemplary.

In the drawings.

THe invention will be described in conjunction with a delta zig-zag connected three-phase power modulator, the term "zig-zag connection" being known in the art. Where appropriate, reference numerals designate the same parts in the various figures.

Figure 2:
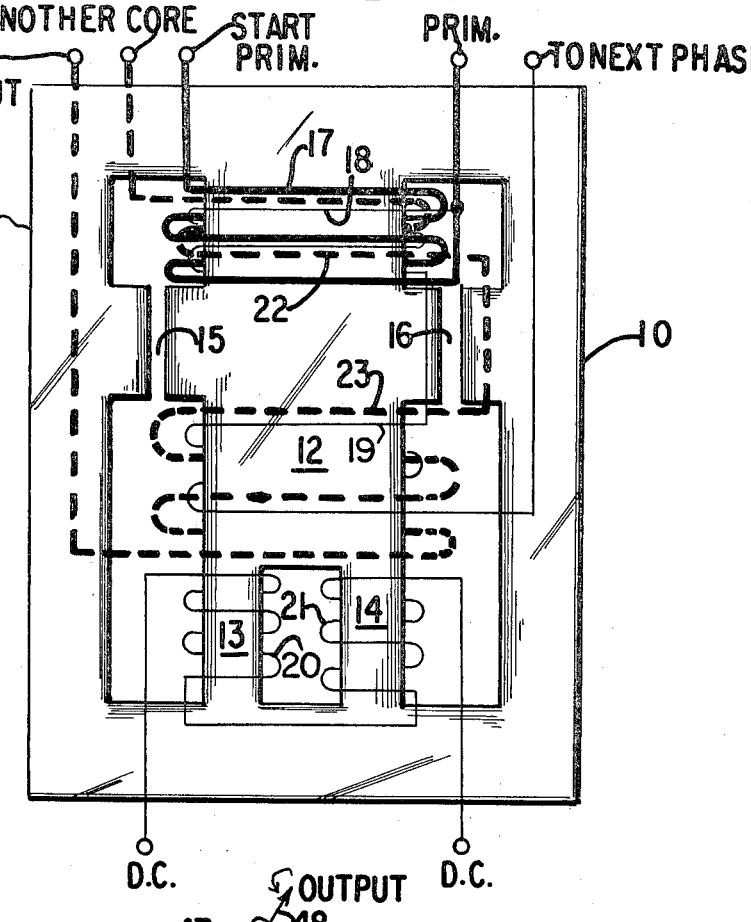
FIG. 2 is one form of core and high leakage transformer for one phase.

Referring to FIG. 2, a single phase-type power modulator is shown which has thereon windings of the zig-zag portions of the three-phase arrangement as well as the single phase windings. The principles of operation of the high leakage transformer power modulator having a magnetic shunt and air gap are described in U. S. Pat. No. 3,172,031.

Figure 1:
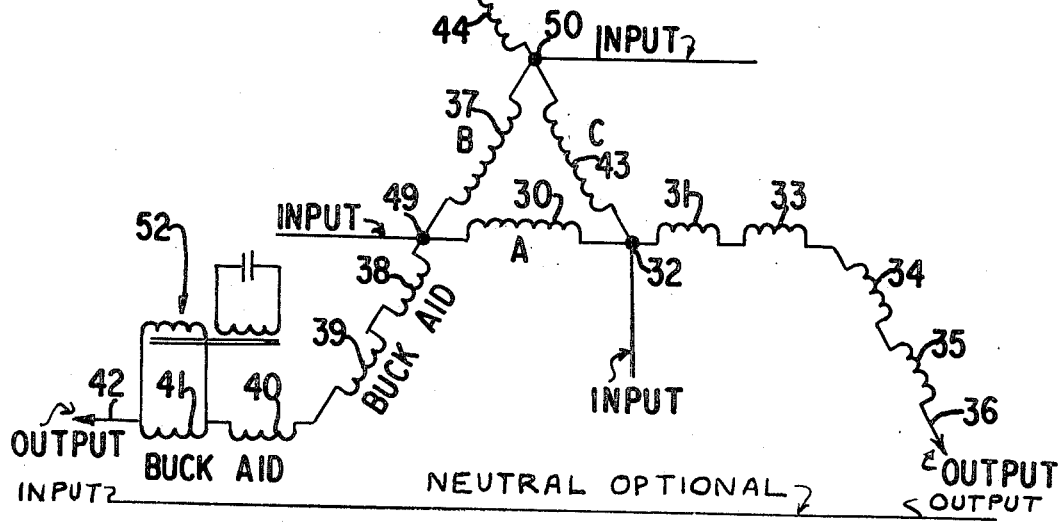
FIG. 1 is a schematic wiring diagram showing the principles of the invention in a three-phase configuration.

In the three-phase circuit of the present invention, three cores, as shown in FIG. 1, are employed.

Referring to FIG. 2, the core comprises outer legs 10, 11 and center leg 12, the center leg in the form shown having a bifurcated end 13, 14. The magnetic shunt air gap paths 15, 16 are located between the center and outer legs. Primary 17, in the form of an autotransformer arrangement, is located on one portion of the center leg with a main or primary section 17 and a boost or series secondary section 18. The secondary winding which is a buck section or portion is located at 19.

The d.c. control windings 20, 21 are located and wound on the two parts of the bifurcated core so that the fundamental frequency will not be introduced therein. When the d.c. windings are energized to saturate the lower portion of the center leg, flux from the primary will pass through the magnetic shunts and return along the upper portions of the side legs, such being described in U.S. Pat. No. 3,172,031.

As will be set forth hereafter, each core has another set of boost and buck coils 22, 23 which are connected to another phase.

Referring now to FIG. 1, the windings on a specific core or leg are shown parallel to each other as will appear hereafter.

First, the A-phase core will be described. Primary 30 with one portion of aiding secondary 31 is arranged in autotransformer arrangement, A-phase input being connected at 32 thereto. One part of the buck portion is shown as bucking secondary 33 connected in series and opposed relation to aiding secondary 31. The other portions, including aiding secondary 34 and bucking secondary 35, are carried on the C-phase core. The output connection is at 36.

B-phase primary 37 is on the B-phase core and is connected in a manner similar to the A-phase to an aiding secondary portion 38 and buck secondary portion 39. The other portions of the B-phase secondaries are aiding secondary 40 and buck secondary 41 located on the A-phase core. The output is at 42.

C-phase primary 43, similar to the other phases, has aiding secondary 44 and bucking secondary 45 connected in series therewith on C-phase core. The second aiding and second bucking secondaries 46, 47, respectively, are connected therewith and are located on B-phase core. Output terminal 48 is connected thereto.

Inputs to the phases are connected to the corner of the delta-connected primaries at 32, 49 and 50.

Figure 3:
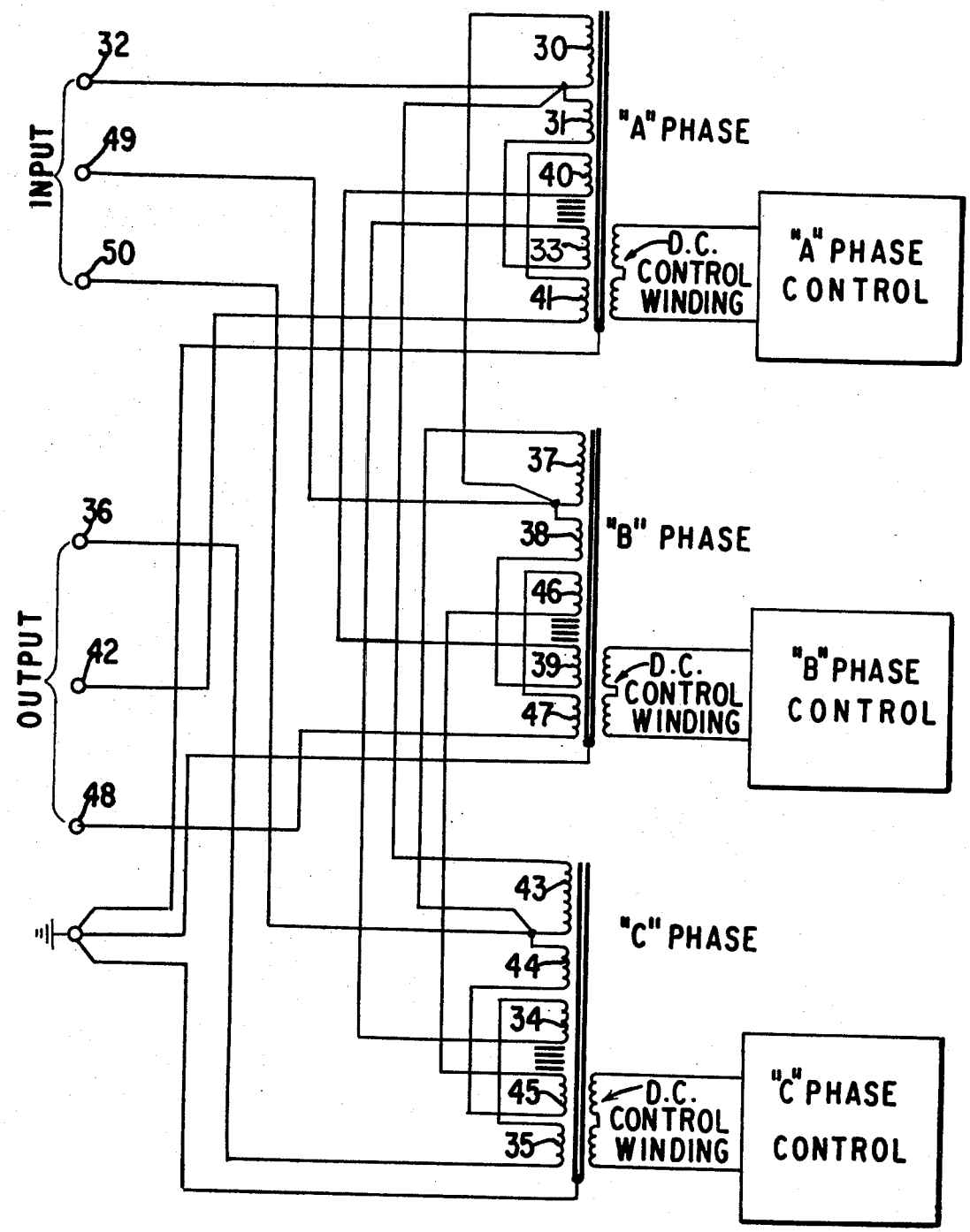
FIG. 3 is a wiring diagram of a circuit employing the invention.

The various secondary elements are located on the cores on either sides of the magnetic shunts as will be apparent from FIG. 3 which also shows the manner in which the coils are connected and the location of the d.c. control windings.

The d.c. control means and windings for each phase are seen in FIG. 3 and such can, for example, be responsive to line voltage.

A filter may be provided as indicated in FIG. 1 at 52.

It is to be understood that variations may be made in the construction and arrangements, such as one or more shunts and different arrangements of the core configuration, without departing from the spirit of the invention except as defined in the appended claims.

What is claimed is:

1. In a polyphase power modulator for controlling power delivered from an a.c. source to a load, the combination including a high leakage reactance transformer core for each phase and having at least one magnetic shunt path with an air gap therein, primary winding means on each core, said primary winding means being connected to the respective phases, first secondary aiding winding means in autotransformer relation to said primary on each core, said primary winding means and aiding winding means being on one side of said magnetic shunt path, bucking winding means on each core on the opposite side of said shunt path, said bucking winding means being connected in series with said aiding winding means, a second set of aiding and bucking winding means connected to said first-mentioned aiding and bucking winding means but located on a different core, the load being connectable to said second set of aiding and bucking winding means, and d.c. control winding means on said core for shifting the primary flux from said secondary bucking winding means.

2. A polyphase power modulator as claimed in claim 1 which has a three-phase source and wherein the primaries are connected in delta.

3. A polyphase power modulator as claimed in claim 2 wherein the output is connected to the input neutral and where the output line to neutral voltage also is regulated.

4. A polyphase power modulator as claimed in claim 2 wherein the d.c. control windings are responsive to the output.

* * * * *